(12) United States Patent
Beyfuss et al.

(10) Patent No.: US 12,287,007 B2
(45) Date of Patent: Apr. 29, 2025

(54) CAGE SEGMENT FOR A SEGMENTED CAGE

(71) Applicant: AKTIEBOLAGET SKF, Gothenburg (SE)

(72) Inventors: Berthold Beyfuss, Wasserlosen-Kaisten (DE); Hans-Juergen Friedrich, Königsberg-Römershofen (DE); Alfred Radina, Poppenlauer (DE); Maximilian Soellner, Bundorf (DE); Jonas Schierling, Hassfurt (DE); Martin Kemmer, Werneck (DE)

(73) Assignee: AKTIEBOLAGET SKF, Gothenburg (SE)

( * ) Notice: Subject to any disclaimer, the term of this patent is extended or adjusted under 35 U.S.C. 154(b) by 120 days.

(21) Appl. No.: 18/091,485

(22) Filed: Dec. 30, 2022

(65) Prior Publication Data

US 2023/0220879 A1 Jul. 13, 2023

(30) Foreign Application Priority Data

Jan. 13, 2022 (DE) .......................... 102022200326.8

(51) Int. Cl.
*F16C 33/46* (2006.01)
*F16C 33/51* (2006.01)
(Continued)

(52) U.S. Cl.
CPC ........ *F16C 33/4676* (2013.01); *F16C 33/467* (2013.01); *F16C 33/4682* (2013.01);
(Continued)

(58) Field of Classification Search
CPC .............. F16C 33/4611; F16C 33/4664; F16C 33/467; F16C 33/4676; F16C 33/4682; F16C 33/50; F16C 33/502; F16C 33/508; F16C 33/51; F16C 33/513; F16C 33/516; F16C 33/54; F16C 33/541; F16C 33/542;
(Continued)

(56) References Cited

U.S. PATENT DOCUMENTS 2,269,224 A 1/1942 Reilly
2,417,559 A 3/1947 Larson
(Continued)

FOREIGN PATENT DOCUMENTS

CN 103415717 A 11/2013
CN 104475350 A 4/2015
(Continued)

OTHER PUBLICATIONS

Machine Translation of JP-2008144879-A (Year: 2008).*
(Continued)

*Primary Examiner* — Alan B Waits
(74) *Attorney, Agent, or Firm* — J-TEK LAW PLLC; Scott T. Wakeman; Mark A. Ussai

(57) ABSTRACT

A bearing cage segment for a segmented bearing cage includes a plurality of walls that define a pocket configured to receive a rolling element and an insert element captively retained in an opening in a first one of the plurality of walls. The insert element may be configured to guide a rolling element retained in the bearing cage and/or be configured as a lubricant reservoir.

16 Claims, 2 Drawing Sheets

(51) Int. Cl.
*F16C 33/54* (2006.01)
*F16C 33/66* (2006.01)

(52) U.S. Cl.
CPC ............ *F16C 33/51* (2013.01); *F16C 33/542* (2013.01); *F16C 33/6648* (2013.01); *F16C 33/6696* (2013.01); *F16C 2300/14* (2013.01)

(58) Field of Classification Search
CPC .. F16C 33/543; F16C 33/548; F16C 33/6696; F16C 33/6648; F16C 2300/14
See application file for complete search history.

(56) References Cited

U.S. PATENT DOCUMENTS

| | | | |
|---|---|---|---|
| 2,591,160 | A | 4/1952 | Kilian |
| 2,721,776 | A | 10/1955 | Ture |
| 2,946,633 | A | 7/1960 | Andreas |
| 3,202,467 | A | 8/1965 | Karl-Albert |
| 3,313,582 | A | 4/1967 | Henry |
| 3,353,246 | A | 11/1967 | Farmer |
| 3,356,428 | A | 12/1967 | Ralph |
| 3,473,857 | A | 10/1969 | Pitner |
| 3,605,247 | A | 9/1971 | Bingle et al. |
| 3,820,867 | A | 6/1974 | Dickinson et al. |
| 3,902,772 | A | 9/1975 | Spate |
| 4,397,507 | A | 8/1983 | Kraus et al. |
| 4,577,088 | A | 3/1986 | Sharp |
| 4,821,386 | A | 4/1989 | Simon et al. |
| 5,187,345 | A | 2/1993 | Alling et al. |
| 5,255,985 | A | 10/1993 | Alling |
| 5,528,706 | A | 6/1996 | Harimoto et al. |
| 6,330,748 | B1 | 12/2001 | Muntnich et al. |
| 6,752,535 | B2 | 6/2004 | Krochak |
| 6,883,968 | B2 | 4/2005 | Fugel et al. |
| 7,571,706 | B2 | 8/2009 | Ichikawa et al. |
| 8,696,210 | B2 | 4/2014 | Kawai et al. |
| 8,770,854 | B2 | 7/2014 | Friedrich et al. |
| 9,239,077 | B2 | 1/2016 | Doki-Thonon et al. |
| 9,382,947 | B2 | 7/2016 | Ishibashi |
| 9,429,194 | B2 | 8/2016 | Reimchen |
| 9,512,881 | B2 | 12/2016 | Katayama et al. |
| 9,551,377 | B2 | 1/2017 | Haas et al. |
| 11,149,793 | B2 | 10/2021 | Friedrich et al. |
| 2007/0248298 | A1 | 10/2007 | Chihara |
| 2008/0245631 | A1 | 10/2008 | Bochen et al. |
| 2012/0063713 | A1 | 3/2012 | Beuerlein |
| 2012/0170883 | A1 | 7/2012 | Evans et al. |
| 2013/0034321 | A1 | 2/2013 | Beck et al. |
| 2013/0308890 | A1 | 11/2013 | Steblau |
| 2015/0159696 | A1 | 6/2015 | Manne et al. |
| 2016/0003298 | A1* | 1/2016 | Masuch ................. F16C 33/50 83/13 |
| 2016/0017919 | A1 | 1/2016 | Haas et al. |
| 2019/0226528 | A1 | 7/2019 | Hainz et al. |
| 2021/0372475 | A1 | 12/2021 | Friedrich et al. |
| 2022/0403883 | A1 | 12/2022 | Beyfuss et al. |
| 2022/0403885 | A1 | 12/2022 | Beyfuss et al. |
| 2022/0403886 | A1 | 12/2022 | Beyfuss et al. |
| 2023/0220877 | A1 | 7/2023 | Beyfuss et al. |
| 2023/0220879 | A1 | 7/2023 | Beyfuss et al. |

FOREIGN PATENT DOCUMENTS

| | | |
|---|---|---|
| CN | 104847794 A | 8/2015 |
| CN | 104847795 A | 8/2015 |
| CN | 105605100 A | 5/2016 |
| CN | 106271725 A | 1/2017 |
| CN | 206215979 U | 6/2017 |
| CN | 107120357 A | 9/2017 |
| DE | 2111081 A1 | 9/1972 |
| DE | 3130610 A1 | 2/1983 |
| DE | 19910928 A1 | 9/2000 |
| DE | 10065169 A1 | 7/2002 |
| DE | 102006045436 A1 | 3/2008 |
| DE | 102008034922 A1 * | 2/2010 ......... F16C 33/4611 |
| DE | 102009017751 A1 | 10/2010 |
| DE | 102009034018 A1 | 12/2010 |
| DE | 102009004657 B4 | 2/2011 |
| DE | 102012221097 A1 | 5/2014 |
| DE | 102013218286 A1 | 3/2015 |
| DE | 102013220833 A1 * | 4/2015 ............. F16C 19/40 |
| DE | 102015210924 A1 | 7/2016 |
| DE | 102015204067 A1 | 9/2016 |
| DE | 102015206533 A1 * | 10/2016 |
| DE | 102016201052 A1 | 7/2017 |
| DE | 102016216286 A1 | 3/2018 |
| DE | 102016222336 A1 | 5/2018 |
| DE | 102017117010 A1 | 7/2018 |
| DE | 102017103761 A1 * | 8/2018 |
| DE | 102017127529 A1 | 5/2019 |
| DE | 102019115335 A1 | 12/2020 |
| EP | 0074803 A1 | 3/1983 |
| EP | 0750125 A1 | 12/1996 |
| EP | 2213894 A1 | 8/2010 |
| EP | 2677184 A1 | 12/2013 |
| EP | 2839175 B1 | 5/2016 |
| EP | 4105506 A1 | 12/2022 |
| FR | 2234483 A1 | 1/1975 |
| FR | 2514440 A1 | 4/1983 |
| FR | 2612102 A1 | 9/1988 |
| FR | 3013087 A1 | 5/2015 |
| GB | 1431612 A | 4/1976 |
| GB | 2103307 A | 2/1983 |
| JP | H0742744 A | 2/1995 |
| JP | H0742744 U | 8/1995 |
| JP | 07317773 A | 12/1995 |
| JP | H07317773 A | 12/1995 |
| JP | H08270658 A | 10/1996 |
| JP | 2005076697 A | 3/2005 |
| JP | 2006064044 A | 3/2006 |
| JP | 2007247856 A | 9/2007 |
| JP | 2008144879 A * | 6/2008 ......... F16C 33/4635 |
| JP | 2008215390 A | 9/2008 |
| JP | 2008215615 A | 9/2008 |
| JP | 2009243556 A | 10/2009 |
| JP | 2011033063 A * | 2/2011 ......... F16C 33/3831 |
| JP | 4786124 B2 | 10/2011 |
| JP | 2013007435 A | 1/2013 |
| JP | 2013061076 A | 4/2013 |
| JP | 2013108587 A | 6/2013 |
| JP | 2015102131 A | 6/2015 |
| JP | 2017026083 A | 2/2017 |
| JP | 6197844 B2 | 9/2017 |
| NL | 6910823 A | 3/1970 |
| WO | 2008040290 A1 | 4/2008 |
| WO | 2014136816 A1 | 9/2014 |
| WO | 2015022355 A1 | 2/2015 |
| WO | 2018109784 A1 | 6/2018 |

OTHER PUBLICATIONS

Machine Translation of DE-102008034922-A1 (Year: 2010).*
Machine Translation of JP-2011033063-A (Year: 2011).*
Machine Translation of DE-102013220833-A1 (Year: 2015).*
Machine Translation of DE-102015206533-A1 (Year: 2016).*
Machine Translation of DE-102017103761-A1 (Year: 2018).*
Extended European Search Report from the European Patent Office dispatched May 12, 2023, in related application No. EP 23150846.6, including European Search Opinion, and machine translation thereof.
Extended European Search Report from the European Patent Office dispatched May 12, 2023, in related application No. EP 23150847.4, including European Search Opinion, and machine translation thereof.
Office Action from the United States Patent Office mailed Apr. 29, 2024 in related U.S. Appl. No. 17/835,124.
Laserjob, Inc., Laser Material Processing, Oct. 2012, p. 2 (Year: 2012).
Unpublished U.S. Appl. No. 18/091,491.
European Search Report from the European Patent Office dispatched Feb. 11, 2022, in related application No. EP 22178213.9, including European Search Opinion.

(56) References Cited

OTHER PUBLICATIONS

Office Action from the United States Patent Office mailed Jun. 1, 2023 in related U.S. Appl. No. 17/835,086.
Office Action from the United States Patent Office mailed Jun. 1, 2023 in related U.S. Appl. No. 17/835,089.
Office Action from the United States Patent Office mailed Mar. 2, 2023 in related U.S. Appl. No. 17/400,177.
Office Action from the United States Patent Office mailed Mar. 30, 2023 in related U.S. Appl. No. 17/350,081.
Office Action from the United States Patent Office mailed Sep. 11, 2024 in related U.S. Appl. No. 18/091,491.

* cited by examiner

CAGE SEGMENT FOR A SEGMENTED CAGE

CROSS-REFERENCE

This application claims priority to German patent application no. 10 2022 200 326.8 filed on Jan. 13, 2022, the contents of which are fully incorporated herein by reference.

TECHNOLOGICAL FIELD

The present disclosure is directed to a cage segment including an opening for receiving an insert and to a rolling-element bearing cage having a plurality of the cage segments.

BACKGROUND

Rolling elements in rolling-element bearings can be guided and retained, for example, by rolling-element bearing cages. A part of the rolling-element bearing cage can also serve as a spacer between the rolling elements. Depending on the size of the rolling elements, for this purpose a certain material strength in the rolling-element bearing cage can be required, especially in zones in which the rolling elements have contact with the rolling-element bearing cage, in order to both compensate for the spacing between the rolling elements and also, in particular with large rolling elements, to be able to withstand the weight of a rolling element. This can be necessary not only in the operation of the rolling-element bearing, but also during the assembly of the rolling-element bearing.

It is known that rolling-element bearing cages can be manufactured on the one hand from metal by various manufacturing methods, and on the other hand from a plastic, for example, by an injection-molding method. Due to the temperature behavior and the strength of the material required, it can be necessary to use in particular a fiberglass-reinforced plastic, such as, for example, fiberglass-reinforced PEEK. However, especially in large bearings, rolling-element bearing cages made of plastic can already be very expensive due to the material quantities required, in particular with plastics having a high price per kilogram.

Metal cages, in particular for larger rolling-element bearings, are usually manufactured by solid material first being rolled and then further processed by machining. What the known methods have in common is that on the one hand they require a large amount of material and on the other hand they require a combination of several, sometimes complex, manufacturing processes with different machine tools so that the manufacture can be complicated and/or expensive. In particular for heavy rolling elements, a greater material thickness can be necessary, which, however, due to the necessary high forces is difficult to reshape for producing rolling-element contact zones.

SUMMARY

It is therefore an aspect of the present disclosure to provide a cage segment for a rolling-element bearing cage, including for a rolling-element bearing cage for use with large rolling-element bearings, that can also withstand high rolling-element weights and can nevertheless be manufactured easily and cost-effectively.

In the following, a cage segment is provided for a segmented cage, in particular for large rolling-element bearings, in which the cage segment forms a pocket that is suited to receive at least one rolling element. The rolling-element bearing can in particular be a roller bearing, i.e., a rolling-element bearing with roller-shaped rolling elements, such as, for example, tapered rollers, cylindrical rollers, barrels, needles, and the like.

Furthermore, the cage segment includes at least one opening that is configured to receive an insert element, the insert element being captively attachable in the opening. The at least one opening can extend, for example, through the entire wall thickness of the cage segment. Alternatively the opening can also extend only partially through the wall thickness of the cage segment, and, for example, be configured as a type of blind hole.

Conventional joining methods can preferably be used in order to captively attach the insert element in the at least one opening. For example, the at least one insert element can be attached in the at least one opening in an interference-fit, friction-fit, and/or material-bonded manner. Furthermore, the insert element can be releasably or captively attached in the at least one opening. For example, the insert element can be attached by clipping, adhering, overmolding, injection molding, and/or welding.

Due to the use of a cage segment and a separate insert element, in comparison to a conventional cage segment, in particular one made of plastic, the cage segment can be designed thinner, since any spacing differences between the rolling elements can be compensated for by the insert element. In addition to a weight and material savings, this has the further advantage that due to the thinner cage segment, especially with large rolling-element bearings, more rolling elements can be accommodated in the rolling-element bearing, whereby a performance and/or a service life of the rolling-element bearing can be increased. Furthermore, due to the material savings compared to a one-part cage milled from a solid blank or a segmented cage made of PEEK plastic, the cage segment is more favorable, since on the one had the material usage is lower and on the other hand the degree of material utilization is higher than with conventional rolling-element bearing cages.

The cage segment preferably includes at least one side element and at least one bridge element, the at least one opening being disposed in the side element and/or the bridge element. For example, if the opening is formed at least in a bridge element, the insert element can be configured for guiding a rolling element. In addition, the insert element can be configured to come into contact with the rolling element. In particular, it is made possible that different requirements for the function and/or quality of a part of the cage segment can be divided over the cage segment itself and the insert element. Here the cage segment can in particular be configured as a frame that is easily and economically manufacturable, for example, from sheet metal, whereas the insert element can be configured to meet the requirements for a rolling-element contact zone and can also withstand high rolling-element weights.

A thickness of the insert element is preferably different from a thickness of the cage segment. A spacing between the rolling element and the cage segment can thereby advantageously be compensated for. For example, when the insert element is disposed on a side element of the cage segment, a length of the rolling element can be compensated for, and when the insert element is disposed on a bridge element, i.e., on a circumferential rolling-element abutment surface, a diameter of the rolling element can be compensated for. For example, a standardized cage segment can thereby be used for different size rolling elements so that it is not necessary to provide a corresponding cage segment for each rolling-element size. Instead, the difference in the geometry between the rolling element and the cage segment can be compensated for by the insert element. In particular, a prototype can thereby also be manufactured in a rapid and simple manner.

According to a further preferred embodiment, the insert element has a shape that is suitable for guiding the rolling element and/or the cage segment. For example, on a side that faces toward the pocket and/or on a side that faces away from the pocket, the insert element can be provided in the region of the rolling-element abutment surface with a shape and/or with a with a structure dependent on the rolling element that is intended to be received in the pocket of the cage segment. A contact between the rolling element and the insert element can thereby advantageously be improved by, for example, reducing a friction between the insert element and the rolling element, and/or improving a guiding of the rolling element.

The insert element can preferably be designed as a lubricant reservoir by providing the surface of the insert element with a structure and/or by manufacturing the insert element is from a solid-lubricant material. For example, the insert element can be manufactured from a sponge-type material, a porous material, and/or a sintered material that can furthermore be configured to store a lubricant, for example, in its pores. Furthermore, the insert element can include at least one first zone and one second zone with the zones differing in at least one property. For example, one zone can be configured to store lubricant, and a further zone can be configured as a damping element.

Furthermore, the insert element can be manufactured from an abrasion-resistant material. For example, the insert element can be manufactured from a metal, preferably from brass and/or steel, and/or from a plastic. This advantageously makes it possible to provide an insert element with a high strength. Alternatively or additionally, the insert element can also be manufactured from a different material, such as, for example, wood, felt, ceramic, etc. The at least one insert element can preferably be cut, in particular laser-cut, punched, and/or nibbled, whereby in turn only low tool costs arise.

According to a further preferred embodiment, the insert element is configured as a damping element, the insert element preferably being manufactured from an elastic material; that is, a material having a greater elasticity than a material from which the walls of the cage segment are formed. For example, the insert element can be made of a hard, abrasion-resistant foam. This makes it possible to reduce impacts and/or blows on the rolling elements since no steel-on-steel contact takes place. In this way it is advantageously possible, in particular with large and/or heavy rolling elements, to prevent adjacent rolling elements and/or the cage segment from being damaged since material chippings can be reduced.

The at least one opening is preferably configured as a recess or a notch. A recess is in particular an opening that extends through the entire wall thickness of the cage segment such that the material of the cage segment forms a closed frame about the recess. In contrast to this, with a notch the material does not form a closed frame so that with a notch the insert element can also be inserted into the opening by sliding. In each case the insert element is formed separately from the walls and meets one or more of the walls at a joint.

According to a further preferred embodiment, the cage segment can be assembled from at least one sheet metal component with at least one joint. The at least one joint can advantageously also provide an adjustment possibility so that the joint is suited to compensate for manufacturing tolerances. In a preliminary manufacturing step, the cage segment is preferably present as a kit that is comprised of one or more flat sheet metal components that are configured to be assembled in order to form the cage segment, the at least one opening being formed in at least one of the sheet metal components of the cage segment, in particular in a preliminary manufacturing step. A material usage and/or manufacturing expense can thereby be reduced.

The insert element is preferably manufactured from a metal, preferably from brass and/or steel, and/or from a plastic, and the at least one insert element is preferably cut, in particular laser cut, punched, and/or nibbled. The sheet metal can in particular be a sheet metal plate, a sheet metal panel, a sheet metal ribbon, in particular a coiled sheet metal ribbon (a so-called coil) or the like. Sheet metal can be processed and shaped easily and cost-effectively, for example, by cutting, laser cutter, embossing, deep-drawing, and bending. Furthermore, a machining process can be omitted so that a degree of material utilization can be increased.

For example, the one or the plurality of the sheet metal components of the cage segment can be cut from a metal sheet, in particular laser-cut, punched, and/or nibbled, so that preferably only low tool costs arise. In other words, the separating lines required for the cage segment are provided in the sheet metal by cutting, punching, nibbling, or the like. This means that the contour of the cage segment is first cut or punched into the sheet metal, and the shape of the cage segment is subsequently released from the sheet metal. Here a laser, a punching tool, a nibbling machine, or the like can be used. The cutting out of the cage segment can advantageously be integrated into an automated manufacturing in an assembly line and/or assembly cell.

The at least one opening is preferably formed in at least one of the sheet metal components of the cage segment, in particular in the preliminary manufacturing step. Forming the opening in a pre-manufacturing step, that is, before the cage segment is assembled, makes it easier to form the recess. The functional element can also be positioned more precisely and quickly in the flat preliminary stage of the cage segment.

According to a further aspect, a rolling-element bearing cage, in particular a multi-part rolling-element bearing cage, is provided with a plurality of the cage segments described above, in which the plurality of cage segments are connectable at least temporarily via a coupling element, the coupling element interacting with at least one connecting element. For example, the cage segment can be connected to a closed cage. Furthermore, for example, every second rolling element can be guided and/or enveloped by a cage segment. Alternatively a cage segment can also be provided for each rolling element.

According to still a further aspect, a rolling-element bearing, in particular a large rolling-element bearing, includes at least one inner ring and at least one outer ring, in which rolling elements are disposed between the inner ring and the outer ring, and in which the rolling elements are held by an above-described rolling-element bearing cage.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
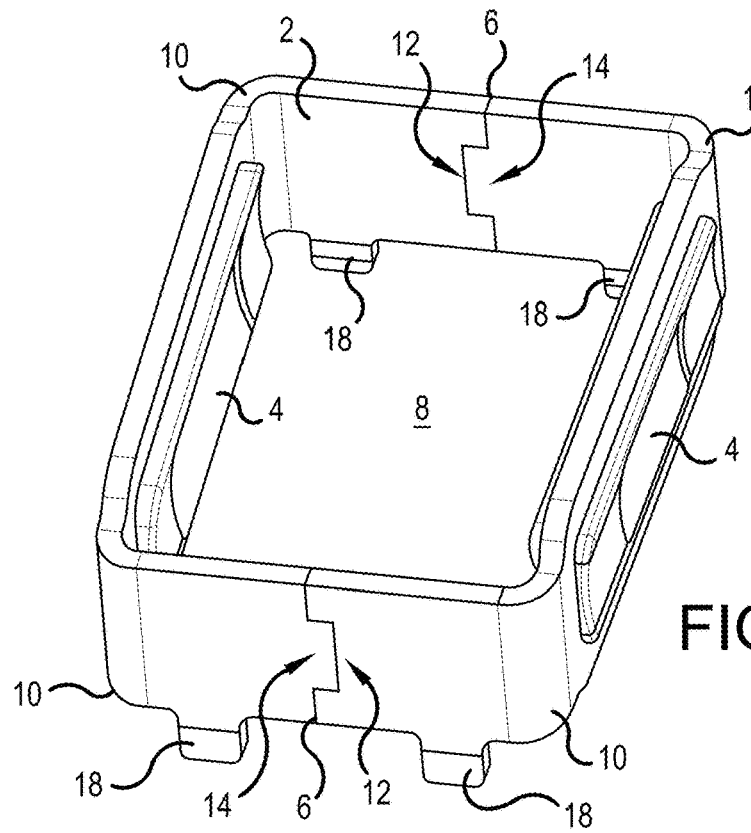
FIG. 1 is a perspective view of a cage segment according to a first embodiment of the present disclosure.
Figure 2:
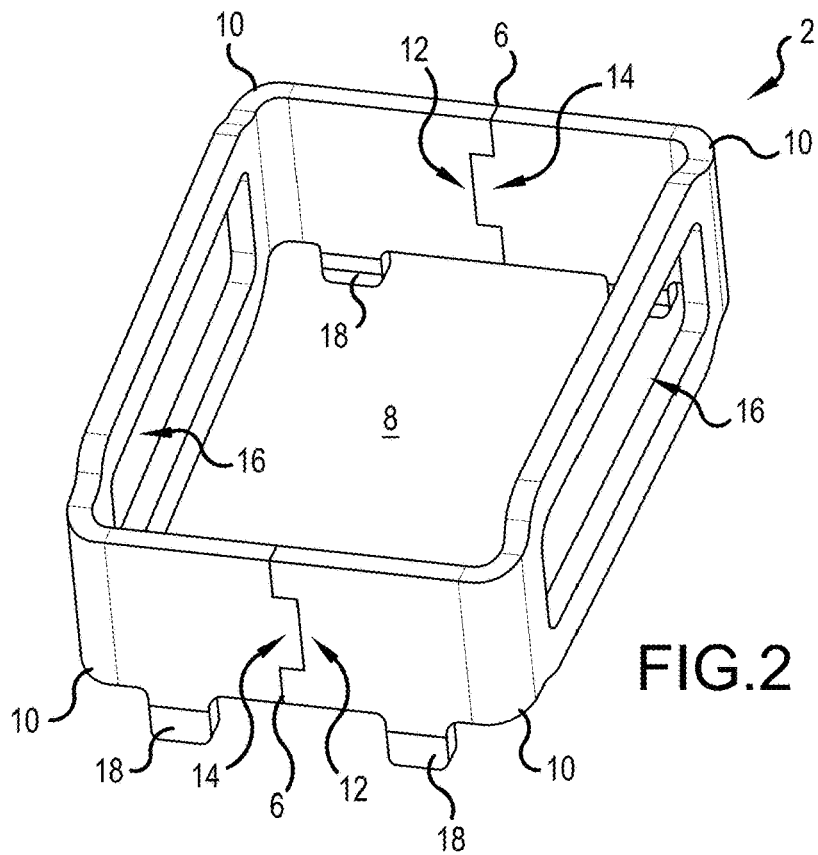
FIG. 2 is a perspective view of the cage segment of FIG. 1.
Figure 3:
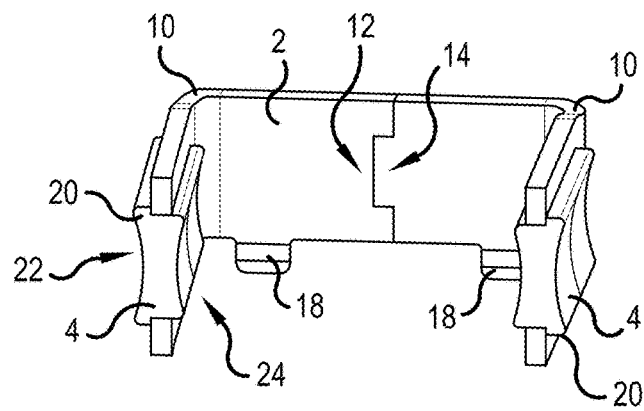
FIG. 3 is a perspective sectional view through the cage segment of FIG. 1.
Figure 4:
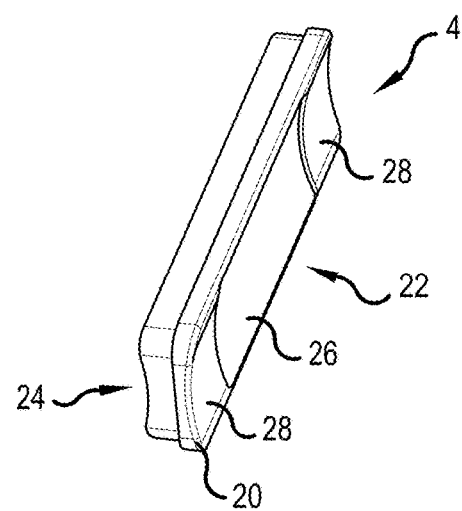
FIG. 4 is a perspective view of the insert segment of FIG. 1.

With reference to FIGS. 1 to 4, a cage segment 2 is shown with an insert element 4 according to a first embodiment. FIG. 1 shows a perspective view of the cage segment 2 with the insert element 4, FIG. 2 shows a perspective view of the cage segment 2 of FIG. 1, FIG. 3 shows a perspective sectional view through the cage segment of FIG. 1, and FIG. 4 shows a perspective view of the insert element of FIG. 1.

The cage segment 2 is comprised of two sheet metal components that are assembled at two joints 6 in order to form a pocket 8 that is configured to receive at least one rolling element. Alternatively the cage segment 2 can also include only one joint 6 or more than two joints 6, for example, four joints. In a preliminary manufacturing step, the cage segment 2 is comprised of a kit with flat sheet-metal components.

The cage segment 2 includes two side elements 9 and two bridge elements 11, and the side elements 9 and/or the bridge elements 11 may be referred to as "walls" of the cage segment 2. The two side elements 9 extend from each bridge element 11, and two bridge elements 11 extend from each side element 9. The side elements 9 and the bridge elements 11 meet at corner regions 10. The side elements 9 are the portions of the cage segment 2 that are intended to face axially when the cage segment 2 is installed between two bearing rings and face the end portions of a rolling element in the pocket 8; the bridge elements 11 are intended to face in the circumferential direction when the cage segment 2 is installed between two bearing rings and face the conical or cylindrical side of a rolling element located between the bridge elements.

In order to assemble the cage segment 2 from the sheet-metal components, the sheet-metal components are each bent at prescribed corner regions 10 and assembled at the two ends of a respective sheet-metal component, whereby the joints 6 are formed. The assembled cage segment 2 forms the pocket 8 that is suited to receive at least one rolling element, the corner regions 10 forming the corners of the cage segment 2. At the ends of the sheet-metal component, a first alignment element 12 and a second alignment element 14 are provided that are complementary to each other. In the embodiment shown in FIGS. 1 to 3, the alignment elements 12, 14 are rectangular projections or toothings. However, other shapes are also conceivable, such as, for example, wave-shaped, triangular, and/or polygonal.

The two alignment elements 12, 14 can be, for example, punched and/or cut. Here the alignment elements 12, 14 are configured to align the cage segment 2 at the joint 6 such that the cage segment 2 can be assembled. In particular, the alignment elements 12, 14 are configured to fix the sides attached to each other in a first direction that is perpendicular to the surface of the pocket 8, and to provide an adjustability, in at least one direction perpendicular to the first direction, which is suited to compensate for manufacturing tolerances and the like.

Furthermore, two openings 16 are provided on the cage segment 2 in the region of a rolling-element assembly surface that are configured to captively receive the insert element 4. Alternatively or additionally, at least one opening 16 can also be provided on a front-surface of the cage segment 2. In FIGS. 1 to 3, the opening 16 is formed as a recess into which the insert element 4 can be inserted. Alternatively the opening can also be configured as a notch into which the insert element 4 can be slid. In the opening 16, the insert element 4 can be attached with a conventional joining method, for example, interference-fit, friction-fit, and/or material-bonded. The openings 16 are preferably already formed in a preliminary manufacturing step, that is, before the cage segment 2 is bent into its final form.

Furthermore, guide elements 18 are provided on the surfaces of the cage segment 2 facing towards a flange of a rolling-element bearing, which guide elements 18 are configured to guide a rolling-element bearing cage against a flange of the rolling-element bearing. A guiding of the rolling-element bearing cage against a raceway of the rolling-element bearing can thereby advantageously be omitted, whereby the service life of the raceways can be increased.

As can be seen in FIGS. 1 and 3, the insert element 4 is inserted into the openings. For this purpose the insert element includes an encircling projection 20 via which the insert element 4 abuts against the cage segment 2 and is thereby held in the opening 16. Of course, designs other than an encircling projection 20 can also be used in order to hold the insert element in the opening 16. For example, instead of an encircling projection 20, a plurality of separate projections can also be provided. If the opening 16 is configured as a notch, a groove can also be provided, either in the insert element or the opening, into which a corresponding projection can be slid.

Furthermore, the insert element 4 is configured to come into contact with the rolling element, and, for example, to hold the rolling element in the pocket 8 at a desired position or to prevent the cage segment 2 from migrating radially outward during use. For this purpose the surfaces 22, 24 of the insert element 4 that face the rolling element in use are provided with a concave curvature in the region of the rolling-element abutment surface to interact with a conical or cylindrical wall of the rolling element. Additionally or alternatively, these surfaces can also be provided with a structure in order to, for example, improve a supply of lubricant to the rolling element. The thickness of the insert element 4 differs from the thickness of the cage segment 2 so that a spacing between the rolling element and the cage segment can advantageously be compensated for. That is, when the insert element 4 is installed in one of the side elements 9 or bridge elements 11, a first portion of the insert element 4 may project from one side of the bridge element 11 and a second portion of the insert element 4 may project from an opposite side of the bridge element 11. In any case, when an insert element 4 is installed on a bridge element 11, the thickness of the insert element 4 in the circumferential direction is greater than the thickness of the bridge element 11 in the circumferential direction. A similar relationship applies when an insert element 4 is installed in one of the side elements 9 except that the relevant thicknesses are then measured in the axial direction.

The insert element 4 is preferably manufactured from an abrasion-resistant material, such as, for example, from a metal, preferably from brass and/or steel, and/or from a plastic. Alternatively or additionally, the insert element 4 can be porous. For example, the insert element 4 can be manufactured from a cast or sintered workpiece so that due to its porosity it can store lubricant and thus serve as a lubricant reservoir. Depending on the material of the insert element 4, the insert element 4 can also have damping properties and can be configured as a damping element that reduces impacts and/or blows on the rolling element. For this purpose the insert element 4 can be manufactured from a hard, abrasion-resistant foam. The insert element 4 can preferably be cut, in particular laser-cut, punched, and/or nibbled, whereby in turn only low tool costs arise. Furthermore, the insert element 4 has a first zone 26 and two second zones 28. The two zones 26 differ from each other in particular in a material property. For example, the first zone 26 is configured to store lubricant, and the second zones 28 are configured as damping element.

Figure 5:
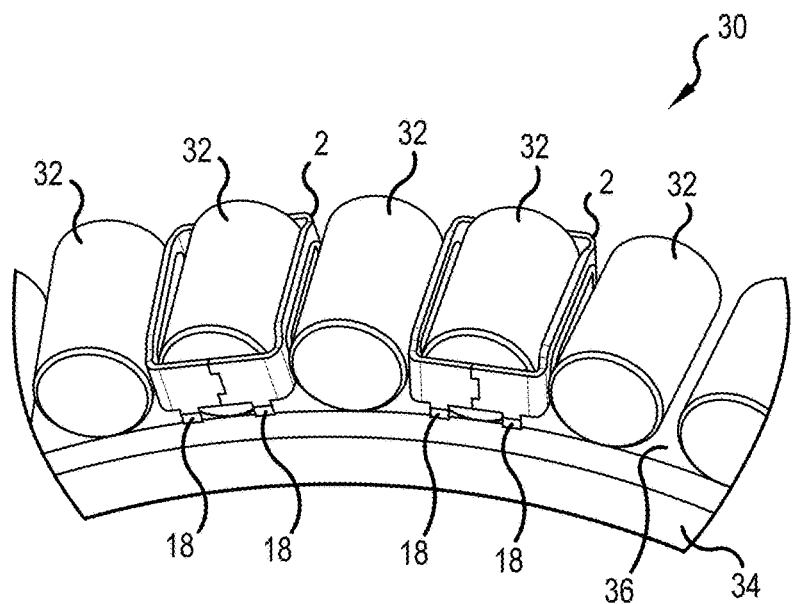
FIG. 5 is a perspective view of a rolling-element bearing cage according to a first embodiment of the present disclosure.

FIG. 5 shows a perspective view of a section of a rolling-element bearing cage 30 in which the cage segment 2 of FIG. 1 is used. The rolling-element bearing cage 30 has a plurality of cage segments 1, as described above, that can be connected, for example, via coupling elements (not depicted). As shown in FIG. 3, for example, the insert element 4 is configured, both on a surface 24 facing toward the pocket 8 and on a surface 22 facing away from the pocket 8, to come into contact with the rolling element 32. Consequently in the rolling-element bearing cage 30, every second rolling element 32 is guided in a pocket 8 of the cage segment 2, while the other half of the rolling elements 32 are respectively guided between two cage segments 2. Alternatively a cage segment 2 can also be provided for each rolling element 32. The rolling elements 32 roll on an inner raceway 36 of an inner ring 34 and on the outer raceway of an outer ring (not shown) of a rolling-element bearing in order to make possible a relative rotation of the inner ring and of the outer ring.

In summary, in order to reduce material usage and manufacturing expense, an assembly is formed from a cage segment 2 and a separate insert element 4. This makes it possible to make the cage segment 2 thinner than a conventional cage segment, in particular made of plastic, since any spacing differences between the rolling elements 32 can be compensated for by the insert element 4. In addition to a weight and material saving, this has the further advantage that due to the thinner cage segment 2, especially with large rolling-element bearings more rolling elements can nevertheless be accommodated in the rolling-element bearing, whereby a performance and/or a service life of the rolling-element bearing can be increased. Furthermore, due to the material savings, compared to a one-part cage milled from a solid blank or a segmented cage made from PEEK plastic, the cage segment 1 is more economical, since on the one hand the material usage is lower, and on the other hand the degree of material utilization is higher than in conventional rolling-element bearing cages.

The cage segment 2 with the insert element 4 makes it possible that the different requirements that are placed on a segment that receives a rolling element 32 can be divided over two components. Here the cage segment 2 can in particular be configured as a frame that is easily and economically manufacturable, for example, from sheet metal, whereas the insert element can be configured to meet the requirements for a rolling-element contact zone, and can also withstand high rolling-element weights. The cage segment can thereby be manufactured with a low material usage and/or a high degree of material utilization, as well as with a relatively low work expense, and thus cost-effectively, in particular even in low quantities.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

2 Cage segment
4 Insert element
6 Joint
8 Pocket
9 Side element
10 Corner region
11 Bridge element
12, 14 Alignment element
16 Opening
18 Guide element
20 Projection
22, 24 Surface
26, 28 Zone
30 Rolling-element bearing cage
32 Rolling element
34 Inner ring
36 Raceway

What is claimed is:

1. A bearing cage segment for a segmented bearing cage comprising:
a plurality of walls that define a pocket configured to receive a first roller, the plurality of walls including a first side element and a first bridge element, and an insert element captively or releasably retained in an opening in the first bridge element, wherein the insert element extends through the first bridge element such that a first portion of the insert element is located on a first side of the first bridge element inside the pocket and a second portion of the insert element is located on a second side of the first bridge element outside the pocket and opposite the first side, wherein the first portion of the insert element has a first concave surface configured to interact with a conical or cylindrical wall of the first roller, and wherein the second portion of the insert element has a second concave surface configured to interact with a conical or cylindrical wall of a second roller.

2. The cage segment according to claim 1,
wherein the insert element is configured as a lubricant reservoir.

3. The cage segment according to claim 1,
wherein the insert element includes pores configured to retain a lubricant.

4. The cage segment according to claim 1,
wherein the insert element comprises a solid lubricant.

5. The cage segment according to claim 1, wherein the insert element is manufactured from a material having an elasticity greater than an elasticity of a material of the plurality of walls.

6. The cage segment according to claim 1,
wherein the opening is a through-opening having a closed perimeter.

7. The cage segment according to claim 1,
wherein the plurality of walls are formed from at least one sheet metal element having at least two ends connected at at least one joint.

8. The cage segment according to claim 1,
wherein the insert element comprises brass or steel or plastic, and
wherein the at least one insert element is formed by laser cutting, punching or nibbling.

9. The cage segment according to claim 1,
wherein the plurality of walls are formed of sheet-metal,
wherein the insert element is configured as a lubricant reservoir,
wherein the insert element is manufactured from a material having an elasticity greater than an elasticity of a material of the plurality of walls, and
wherein the opening is a through-opening having a closed perimeter.

10. A rolling-element bearing cage comprising a plurality of cage segments according to claim 1.

11. The rolling-element bearing cage according to claim 1,
wherein the insert element meets the bridge element at a joint.

12. The cage segment according to claim 1,
wherein the insert element includes a third portion between the first portion and the second portion, and
wherein the insert element is retained in the opening by a friction fit between an interior edge of the opening and the third portion of the insert element or by a material bond between the interior edge of the opening and the third portion of the insert element.

13. The cage segment according to claim 12,
wherein a radial width of the first concave surface is less than a radial width of the second concave surface.

14. The cage segment according to claim 12,
wherein the first portion of the insert element is configured to be pressed through the opening in a circumferential direction, and
wherein the second portion of the insert element is too large to pass through the opening in the circumferential direction.

15. The cage segment according to claim 1,
wherein a radial width of the first concave surface is less than a radial width of the second concave surface.

16. The cage segment according to claim 1,
wherein the first portion of the insert element is configured to be pressed through the opening in a circumferential direction, and
wherein the second portion of the insert element is too large to pass through the opening in the circumferential direction.

* * * * *